United States Patent
Zhuang

(10) Patent No.: US 11,974,067 B2
(45) Date of Patent: Apr. 30, 2024

(54) CONFERENCE RECORDING METHOD AND APPARATUS, AND CONFERENCE RECORDING SYSTEM

(71) Applicant: Huawei Technologies Co., Ltd., Shenzhen (CN)

(72) Inventor: Songhai Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 17/563,859

(22) Filed: Dec. 28, 2021

(65) Prior Publication Data

US 2022/0124280 A1 Apr. 21, 2022

Related U.S. Application Data

(63) Continuation of application No. PCT/CN2020/083402, filed on Apr. 5, 2020.

(30) Foreign Application Priority Data

Jun. 28, 2019 (CN) .......................... 201910577597.9

(51) Int. Cl.
*H04N 5/765* (2006.01)
*G06V 10/74* (2022.01)
(Continued)

(52) U.S. Cl.
CPC ............. *H04N 5/765* (2013.01); *G06V 10/74* (2022.01); *G06V 10/82* (2022.01); *G06V 40/10* (2022.01);
(Continued)

(58) Field of Classification Search
CPC ........ H04N 5/765; H04N 5/265; H04N 19/30; H04N 7/152; H04N 7/155; H04N 7/15;
(Continued)

(56) References Cited

U.S. PATENT DOCUMENTS 8,723,911 B1 * 5/2014 Shochet ............... G06V 40/172
  348/14.01
9,282,284 B2 * 3/2016 Kajarekar ............ G06V 40/172
  (Continued)

FOREIGN PATENT DOCUMENTS

CN 101662643 A 3/2010
CN 101771853 A 7/2010
(Continued)

OTHER PUBLICATIONS

"Series H: Audiovisual and Multimedia Systems, Infrastructure of audiovisual services—Coding of moving video, Advanced video coding for generic audiovisual services," Recommendation ITU-T H.264, ITU-T Telecommunication Standardization Sector of ITU, Total 836 pages, International Telecommunication Union, Geneva, Switzerland (Jun. 2019).

(Continued)

*Primary Examiner* — Yosef K Laekemariam
(74) *Attorney, Agent, or Firm* — Leydig, Voit & Mayer, Ltd.

(57) ABSTRACT

A conference recording method includes: A multipoint control unit determines, based on feature information of a person, an audio video bitstream that needs to be recorded, from audio video bitstreams sent by site terminals. The feature information includes picture information or sound information. The multipoint control unit sends, to a recording server, the audio video bitstream that needs to be recorded, so that the recording server performs conference recording. The feature information of the person is used to implement automatic screening on the audio video bitstream that need to be recorded.

12 Claims, 6 Drawing Sheets

(51) Int. Cl.
  *G06V 10/82* (2022.01)
  *G06V 40/10* (2022.01)
  *H04L 65/60* (2022.01)
  *H04N 5/265* (2006.01)
  *H04N 19/30* (2014.01)
(52) U.S. Cl.
  CPC ............ *H04L 65/60* (2013.01); *H04N 5/265* (2013.01); *H04N 19/30* (2014.11)
(58) Field of Classification Search
  CPC .......... H04N 5/76; G06V 10/74; G06V 10/82; G06V 40/10; H04L 65/60
  See application file for complete search history.

(56) References Cited

U.S. PATENT DOCUMENTS

| | | |
|---|---|---|
| 2009/0210491 A1 | 8/2009 | Thakkar et al. |
| 2011/0261142 A1 | 10/2011 | Shanmukhadas et al. |
| 2016/0283860 A1 | 9/2016 | Pycock et al. |
| 2017/0302718 A1 | 10/2017 | Ananthanarayanan et al. |
| 2018/0123814 A1 | 5/2018 | Sexauer et al. |
| 2019/0379742 A1* | 12/2019 | Simpkinson ......... G06V 40/172 |

FOREIGN PATENT DOCUMENTS

| | | | |
|---|---|---|---|
| CN | 102055949 A | 5/2011 | |
| CN | 102223515 * | 10/2011 | ............... H04N 5/92 |
| CN | 102968991 A | 3/2013 | |
| CN | 103475835 A | 12/2013 | |
| CN | 104767963 A | 7/2015 | |
| CN | 105100892 A | 11/2015 | |
| CN | 105141879 A | 12/2015 | |
| CN | 105448289 A | 3/2016 | |
| CN | 105512348 A | 4/2016 | |
| CN | 105719659 A | 6/2016 | |
| CN | 107360387 A | 11/2017 | |
| CN | 108243320 * | 7/2018 | ............... H04N 7/15 |
| CN | 108305632 A | 7/2018 | |
| CN | 109597898 A | 4/2019 | |
| CN | 109640016 A | 4/2019 | |
| CN | 109788235 A | 5/2019 | |

OTHER PUBLICATIONS

"Series H: Audiovisual and Multimedia Systems, Infrastructure of audiovisual services—Systems and terminal equipment for audiovisual services, Packet-based multimedia communications systems, Amendment 1: Use of Facility message to enable call transfer," Recommendation ITU-T H.323 (2009)—Amendment 1, ITU-T Telecommunication Standardization Sector of ITU, Total 8 pages, International Telecommunication Union, Geneva, Switzerland (Mar. 2013).

Huang Kang-quan et al., "Application of Kinect in the video conference system," Journal of Guangxi University (Natural Science Edition), vol. 36 Sup. 1, total 6 pages (Oct. 2011). With English abstract.

* cited by examiner

CONFERENCE RECORDING METHOD AND APPARATUS, AND CONFERENCE RECORDING SYSTEM

CROSS-REFERENCE TO RELATED APPLICATIONS

This application is a continuation of International Application No. PCT/CN2020/083402, filed on Apr. 5, 2020, which claims priority to Chinese Patent Application No. 201910577597.9, filed on Jun. 28, 2019. The disclosures of the aforementioned applications are hereby incorporated by reference in their entireties.

TECHNICAL FIELD

This application relates to the field of multimedia technologies, and in particular, to a conference recording method and apparatus, and a conference recording system.

BACKGROUND

Conference recording is an important function in the field of multimedia technologies. Content of a conference held by using a multipoint control unit (MCU) is recorded by using a recording server, to facilitate conference rebroadcasting, post production, and the like. As a video conference is more widely applied, conference recording during the video conference becomes a frequent and important requirement.

Conventionally, conference recording is generally recording an audio and a video of an entire conference. However, manual browsing and editing are required when speeches or pictures of persons need to be found subsequently. In this manner, the manual costs are high, and recording efficiency is low.

SUMMARY

To resolve the foregoing technical problems, this application provides a conference recording method and apparatus, and a conference recording system, to automatically determine an audio video bitstream that needs to be recorded, thereby improving conference recording efficiency and reducing the manual costs.

According to a first aspect, this application provides a conference recording method, including the following steps:

First, a multipoint control unit determines, based on feature information of a to-be-recorded person, an audio video bitstream that needs to be recorded, from audio video bitstreams sent by site terminals. The feature information may include picture information or sound information. Then, the multipoint control unit sends, to a recording server, the audio video bitstream that needs to be recorded and that is determined in the previous step, so that the recording server performs conference recording.

Because different persons have different feature information, the audio video bitstream that needs to be recorded and that is determined based on the feature information of the to-be-recorded person accurately corresponds to the to-be-recorded person. Therefore, by using this method, the audio video bitstream that needs to be recorded can be automatically determined based on the feature information of the to-be-recorded person for recording. A manual screening process is not required, thereby reducing the manual costs of conference recording. In addition, conference recording efficiency is also effectively improved through automatic screening, and the conference recording becomes more convenient. In this way, an efficient implementation solution for application expansion of a conference recording function is provided.

In actual application, there are various recording requirements. For example, a recording requirement may be (1) recording an entire audio video bitstream of a site in which the to-be-recorded person is located; or a recording requirement may be (2) recording a personal audio video bitstream of the to-be-recorded person. The following describes specific screening manners for the foregoing two different recording requirements.

For the recording requirement (1), the multipoint control unit first determines a site terminal of the to-be-recorded person. In specific implementation, the multipoint control unit determines, based on the feature information of the to-be-recorded person and the audio video bitstreams sent by the site terminals, the site terminal corresponding to the to-be-recorded person. Subsequently, a multipoint control unit uses, as the audio video bitstream that needs to be recorded, an entire audio video bitstream sent by the determined site terminal, to meet the recording requirement (1).

For the recording requirement (2), the multipoint control unit also needs to first determine the site terminal of the to-be-recorded person. This step is similar to the implementation in the requirement (1). Then, the multipoint control unit determines the personal audio video bitstream of the to-be-recorded person based on the feature information of the to-be-recorded person, from an audio video bitstream sent by the determined site terminal. For example, in a conference process, the to-be-recorded person makes a speech for three times in total. A specific time interval exists between each time and a next time. If the feature information of the to-be-recorded person is the sound information, three audio video bitstream segments of the speech made by the to-be-recorded person may be specifically determined in this application, and are used as the audio video bitstream that needs to be recorded, to meet the recording requirement (2).

A conference recording method provided in this application can meet a plurality of recording requirements, and therefore has relatively strong applicability and meets a plurality of recording applications in a conference recording scenario. In particular, manual editing is not needed for the recording requirement (2), thereby improving convenience of subsequent application of the recorded conference.

When the site terminal is determined, the following manner may be specifically used for the determining:

First, the multipoint control unit decodes the audio video bitstreams sent by the site terminals, to obtain decoded video bitstreams and decoded audio bitstreams. If the feature information includes the picture information, the multipoint control unit performs feature matching based on the picture information and the decoded video bitstreams, to determine the site terminal corresponding to the to-be-recorded person. If the feature information includes the sound information, the multipoint control unit performs feature matching between the sound information and the decoded audio bitstreams, to determine the site terminal corresponding to the to-be-recorded person.

The site terminal corresponding to the to-be-recorded person, that is, the site terminal configured in the site in which the to-be-recorded person is located, can be uniquely and accurately determined based on the feature information. Therefore, the to-be-recorded person certainly does not correspond to another site terminal. Audio video bitstreams sent by the other site terminals can be efficiently screened out, thereby reducing analysis and processing loads on the multipoint control unit.

In actual application, a plurality of site terminals in a conference scenario may be all advanced video coding (AVC) site terminals, or may be all scalable video coding (SVC) site terminals. The following describes a specific implementation of this method in this application for different site terminals.

Optionally, the site terminals are all AVC site terminals. When the to-be-recorded person corresponds to at least two different AVC site terminals, the multipoint control unit determines the audio video bitstreams. First, the multipoint control unit determines, based on the feature information of the to-be-recorded person, the audio video bitstream that needs to be recorded, from audio video bitstreams sent by the at least two different AVC site terminals. If the audio video bitstream that needs to be recorded includes a video bitstream that needs to be recorded and an audio bitstream that needs to be recorded, the multipoint control unit performs picture compositing on the video bitstream that needs to be recorded, to obtain a composite picture, and sends the composite picture to the recording server; and performs audio mixing on the audio bitstream that needs to be recorded, and then sends the mixed audio bitstream to the recording server.

When the audio video bitstream that needs to be recorded is personal audio video bitstreams of a plurality of to-be-recorded persons, in the conference recording method provided in this embodiment, the multipoint control unit is used to perform the picture compositing and the audio mixing and then send the composite picture and the mixed audio bitstream to the recording server, thereby greatly reducing a network bandwidth and saving storage space of the recording server. In addition, real-time recording is performed on the specified to-be-recorded person, to avoid an editing process of the audio bitstream and the video bitstream in manual post production, thereby reducing the manual costs and improving conference recording efficiency.

Optionally, the site terminal is an SVC site terminal. When the to-be-recorded person corresponds to at least two different SVC site terminals, the multipoint control unit determines audio video bitstreams. First, the multipoint control unit notifies all the SVC site terminals of a bitstream format applicable to the recording server; then, receives audio video bitstreams that are in the bitstream format applicable to the recording server and that are sent by the at least two different SVC site terminals; and finally, determines, based on the feature information of the to-be-recorded person, the audio video bitstream that needs to be recorded, from the audio video bitstreams in the bitstream format applicable to the recording server. In other words, the bitstream format of the determined audio video bitstream can be received and processed by the recording server. If the audio video bitstream that needs to be recorded includes a video bitstream that needs to be recorded and an audio bitstream that needs to be recorded, the multipoint control unit sends, to the recording server, video bitstreams that need to be recorded and that correspond to the at least two different SVC site terminals, so that the recording server performs picture compositing on the video bitstreams that need to be recorded and that correspond to the at least two different SVC site terminals, to obtain a composite picture. Audio mixing is performed by the multipoint control unit. The multipoint control unit performs audio mixing on audio bitstreams that need to be recorded and that correspond to the at least two different SVC site terminals, and then sends the mixed audio bitstream to the recording server.

When the audio video bitstream that needs to be recorded is personal audio video bitstreams of a plurality of to-be-recorded persons, in the conference recording method provided in this embodiment, the multipoint control unit is used to perform the audio mixing and then send the mixed audio bitstream to the recording server, so that the recording server performs picture compositing on video bitstreams that are of the plurality of to-be-recorded persons and that are determined by the MCU and need to be recorded and finally performs conference recording, thereby greatly reducing a network bandwidth and saving storage space of the recording server. In addition, in this embodiment, real-time recording is performed on the specified to-be-recorded person, to avoid an editing process of the audio bitstream and the video bitstream in manual post production, thereby reducing the manual costs and improving conference recording efficiency.

Optionally, that the multipoint control unit determines, based on the feature information of the to-be-recorded person, the audio video bitstream that needs to be recorded, from the audio video bitstreams specifically includes: The multipoint control unit determines, by using a pre-trained neural network model based on the feature information of the to-be-recorded person, the audio video bitstream that needs to be recorded, from the audio video bitstreams.

The determining is performed by using the neural network model, to improve screening efficiency for the audio video bitstream and further improve an overall speed of a conference recording process, thereby improving conference recording experience of a user.

According to a second aspect, this application provides a conference recording apparatus. The apparatus includes a bitstream screening module and a bitstream sending module. The bitstream screening module determines, based on feature information of a to-be-recorded person, an audio video bitstream that needs to be recorded, from audio video bitstreams sent by site terminals. The bitstream sending module sends, to a recording server, the audio video bitstream that needs to be recorded, so that the recording server performs conference recording.

The apparatus accurately determines, based on the feature information, the audio video bitstream that needs to be recorded. The audio video bitstream matches the to-be-recorded person, to implement automatic screening for the audio video bitstream. In comparison with manual screening and recording, efficiency is greatly improved, and the manual costs are reduced.

Optionally, when the audio video bitstream that needs to be recorded is an entire audio video bitstream of a site in which the to-be-recorded person is located, the bitstream screening module specifically includes a site terminal screening unit and a first bitstream screening unit.

The site terminal screening unit is configured to determine, based on the feature information of the to-be-recorded person and the audio video bitstreams sent by the site terminals, a site terminal corresponding to the to-be-recorded person.

The first bitstream screening unit is configured to use, as the audio video bitstream that needs to be recorded, an entire audio video bitstream sent by the determined site terminal.

Optionally, when the audio video bitstream that needs to be recorded is a personal audio video bitstream of the to-be-recorded person, the bitstream screening module specifically includes a site terminal screening unit and a second bitstream screening unit.

The site terminal screening unit is configured to determine, based on the feature information of the to-be-recorded person and the audio video bitstreams sent by the site terminals, a site terminal corresponding to the to-be-recorded person.

The second bitstream screening unit is configured to: from an audio video bitstream sent by the determined site terminal, determine the personal audio video bitstream of the to-be-recorded person based on the feature information of the to-be-recorded person, and use the personal audio video bitstream as the audio video bitstream that needs to be recorded.

Optionally, the site terminal screening unit specifically includes a decoding subunit and a site terminal determining subunit.

The decoding subunit is configured to decode the audio video bitstreams sent by the site terminals, to obtain decoded video bitstreams and decoded audio bitstreams.

The site terminal determining subunit is configured to: perform feature matching based on picture information of the to-be-recorded person and the decoded video bitstreams, to determine the site terminal corresponding to the to-be-recorded person; or perform feature matching between sound information of the to-be-recorded person and the decoded audio bitstreams, to determine the site terminal corresponding to the to-be-recorded person.

Optionally, the site terminal is an advanced video coding (AVC) site terminal. When the to-be-recorded person corresponds to at least two different AVC site terminals, the bitstream screening module specifically includes a third bitstream screening unit.

The third bitstream screening unit is configured to determine, based on the feature information of the to-be-recorded person, the audio video bitstream that needs to be recorded, from audio video bitstreams sent by the at least two different AVC site terminals.

Optionally, the audio video bitstream that needs to be recorded includes a video bitstream that needs to be recorded and an audio bitstream that needs to be recorded, and the bitstream sending module specifically includes a picture compositing unit, a picture sending unit, a first audio mixing unit, and a first audio sending unit.

The picture compositing unit is configured to perform picture compositing on the video bitstream that needs to be recorded, to obtain a composite picture.

The picture sending unit is configured to send the composite picture to the recording server.

The first audio mixing unit is configured to perform audio mixing on the audio bitstream that needs to be recorded.

The first audio sending unit is configured to send, to the recording server, an audio obtained after the audio mixing.

Optionally, the site terminal is a scalable video coding (SVC) site terminal. When the to-be-recorded person corresponds to at least two different SVC site terminals, the bitstream screening module specifically includes a bitstream format notifying unit, a bitstream receiving unit, and a fourth bitstream screening unit.

The bitstream format notifying unit is configured to notify all the SVC site terminals of a bitstream format applicable to the recording server.

The bitstream receiving unit is configured to receive audio video bitstreams that are in the bitstream format applicable to the recording server and that are sent by the at least two different SVC site terminals.

The fourth bitstream screening unit is configured to determine, based on the feature information of the to-be-recorded person, the audio video bitstream that needs to be recorded, from the audio video bitstreams in the bitstream format applicable to the recording server.

Optionally, the audio video bitstream that needs to be recorded includes a video bitstream that needs to be recorded and an audio bitstream that needs to be recorded, and the bitstream sending module specifically includes a video bitstream sending unit, a second audio mixing unit, and a second audio sending unit.

The video bitstream sending unit is configured to send, to the recording server, video bitstreams that need to be recorded and that correspond to the at least two different SVC site terminals, so that the recording server performs picture compositing on the video bitstreams that need to be recorded and that correspond to the at least two different SVC site terminals, to obtain a composite picture.

The second audio mixing unit is configured to perform audio mixing on audio bitstreams that need to be recorded and that correspond to the at least two different SVC site terminals.

The second audio sending unit is configured to send, to the recording server, an audio obtained after the audio mixing.

Optionally, the bitstream screening module specifically includes a fifth bitstream screening unit.

The fifth bitstream screening unit is configured to determine, by using a pre-trained neural network model based on the feature information of the to-be-recorded person, the audio video bitstream that needs to be recorded, from the audio video bitstreams.

According to a third aspect, this application provides a conference recording system, including a multipoint control unit, a recording server, and at least two site terminals.

The site terminal is configured to send an audio video bitstream to the multipoint control unit.

The multipoint control unit is configured to: determine, based on feature information of a to-be-recorded person, an audio video bitstream that needs to be recorded, from the audio video bitstreams sent by the site terminals, where the feature information includes picture information or sound information; and send, to the recording server, the audio video bitstream that needs to be recorded.

The recording server is configured to perform conference recording based on the audio video bitstream that needs to be recorded.

The system accurately determines, based on the feature information, the audio video bitstream that needs to be recorded, from the plurality of audio video bitstreams provided by the site terminals. The audio video bitstream matches the to-be-recorded person, to implement automatic screening for the audio video bitstream. In comparison with manual screening and recording, efficiency is greatly improved, and the manual costs are reduced.

Embodiments of this application have the following advantages:

The feature information (including the picture information or the sound information) of the to-be-recorded person is different from feature information of another participant. In other words, the feature information of the to-be-recorded person uniquely corresponds to the to-be-recorded person. Therefore, the multipoint control unit (MCU) can accurately determine, based on the feature information of the to-be-recorded person, the audio video bitstream that needs to be recorded, from the audio video bitstreams sent from sites. Then, the MCU sends, to the recording server, the audio video bitstream that needs to be recorded, so that the recording server can perform conference recording based on the audio video bitstream received from the MCU. In this method, based on the feature information of the to-be-recorded person, automatic screening is implemented on the audio video bitstream that needs to be recorded. In this way, no manual screening is required, thereby reducing the manual costs of the conference recording and greatly improving conference recording efficiency. This method is used to improve convenience of the conference recording and promote wide application of a video conference function.

DESCRIPTION OF EMBODIMENTS

When conference recording is performed on a conventional video conference, an audio video bitstream of a conference in which persons participate needs to be manually searched for. It is assumed that the person appears or makes a speech at the end of the conference. To record the conference in which the person participates, the entire conference needs to be manually searched to determine that the person participates in the conference. A conventional conference recording method largely relies on a manual operation. This method is inefficient with the relatively high manual costs.

In view of this problem, the present application provides a conference recording method and apparatus, and a conference recording system. In this application, feature information of a to-be-recorded person is used to screen audio video bitstreams of a plurality of sites. Because different persons have different feature information (including picture information or sound information), an audio video bitstream including the feature information of the to-be-recorded person can be accurately identified based on the feature information of the to-be-recorded person, thereby implementing automatic screening on the audio video bitstreams. An MCU determines an audio video bitstream that needs to be recorded, and sends, to a recording server, the audio video bitstream that needs to be recorded, so that the server can perform conference recording based on the audio video bitstream received from the MCU. In technical solutions provided in this application, the manual costs are reduced, and conference recording efficiency is improved.

Figures 1, 2:
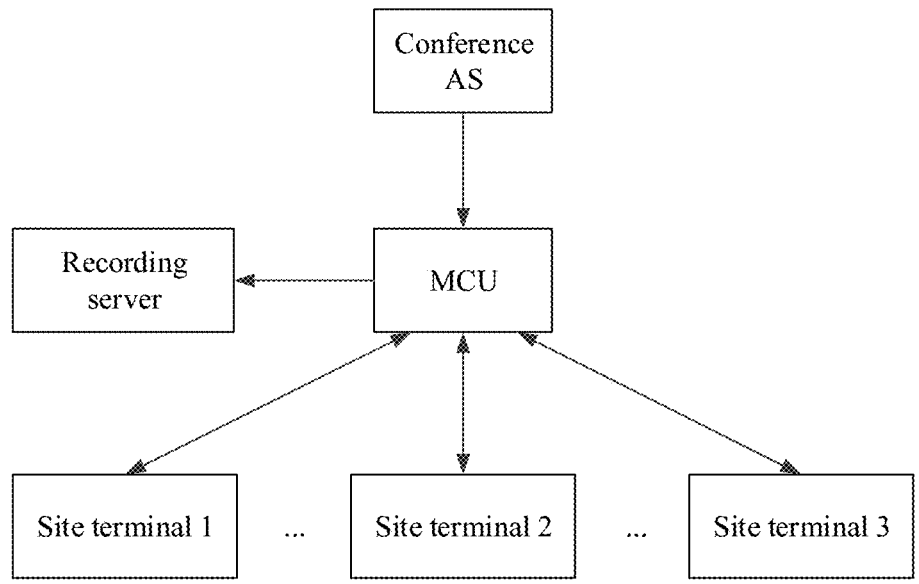
FIG. 1 is a schematic diagram of a conference recording scenario according to an embodiment of this application.
FIG. 2 is a flowchart of a conference recording method according to an embodiment of this application.

To facilitate understanding of technical solutions of this application, with reference to the accompanying drawings, the following describes an application scenario of a conference recording method provided in this application. FIG. 1 is a schematic diagram of a conference recording scenario according to an embodiment of this application.

As shown in FIG. 1, an application scenario of the conference recording method provided in this application includes: a multipoint control unit (MCU), a recording server, a conference application server (AS), and a plurality of site terminals. In actual application, a quantity of site terminals may be two or more. In FIG. 1, three site terminals are used as only an example. A specific quantity of site terminals in the conference recording scenario is not limited in this embodiment. In FIG. 1, the three site terminals are respectively a site terminal 1, a site terminal 2, and a site terminal 3. Different site terminals belong to different sites.

The MCU and the recording server are located in the same local area network. In the conference recording scenario, the conference AS serves as a videoconferencing service management platform. A user reserves a conference by using the conference AS, and provides or specifies a material that includes feature information of a to-be-recorded person. Herein, the feature information may include picture information or sound information. In other words, the feature information may include only the picture information, or may include only the sound information, or may include both the picture information and the sound information.

For example, the user may upload, to the conference AS, the material that includes the feature information of the to-be-recorded person, for example, a picture or an audio file of the to-be-recorded person. The conference AS processes the picture to obtain the picture information of the to-be-recorded person. The picture information may be specifically a picture feature, for example, a facial feature. The conference AS processes the audio file to obtain the sound information of the to-be-recorded person. The sound information may be specifically a voiceprint feature. It may be understood that the feature information of the to-be-recorded person is different from feature information of another person. In other words, the feature information of the to-be-recorded person uniquely corresponds to the to-be-recorded person. The to-be-recorded person can be uniquely determined based on the feature information of the to-be-recorded person.

For another example, the conference AS stores materials respectively corresponding to a plurality of persons, for example, pictures or audio files of the persons, and the conference AS obtains, through preprocessing, picture information and sound information corresponding to each person. The user can select, from the materials of the plurality of to-be-selected persons in the conference AS according to a requirement, the material that includes the feature information of the to-be-recorded person, for example, select a picture or an audio file of the to-be-recorded person. The conference AS can determine, based on the selection of the user, the to-be-recorded person specified by the user.

The conference AS calls a conference to the multipoint control unit (MCU), and delivers the feature information of the to-be-recorded person to the MCU during the calling. The MCU calls the site terminal 1, the site terminal 2, and the site terminal 3 to participate in the conference. After participating in the conference, each terminal sends an audio video bitstream to the MCU. The MCU determines, based on the feature information that is of the to-be-recorded person and that is delivered by the conference AS, an audio video bitstream that needs to be recorded, from the audio video bitstreams sent by the site terminals.

For example, in an actual case, the to-be-recorded person participates in the conference by using the site terminal 2. Therefore, in the audio video bitstream sent by the site terminal 2 to the MCU, a video bitstream carries the picture information of the to-be-recorded person, and an audio bitstream carries the sound information of the to-be-recorded person. If the feature information of the to-be-recorded person is specifically the picture information, the MCU can perform matching between the picture information and the video bitstreams sent by the site terminals, to determine that the to-be-recorded person participates in the conference by using the site terminal 2, determine the audio video bitstream sent by the site terminal 2, and send the audio video bitstream to the recording server, so that the recording server performs the conference recording. If the feature information of the to-be-recorded person is specifically the sound information, the MCU can perform matching between the sound information and the audio bitstreams sent by the site terminals, to determine that the to-be-recorded person participates in the conference by using the site terminal 2, determine the audio video bitstream sent by the site terminal 2, and send the audio video bitstream to the recording server, so that the recording server performs the conference recording.

With reference to the accompanying drawings and embodiments, the following describes a conference recording method provided in embodiments of this application.

Method Embodiment 1

FIG. 2 is a flowchart of a conference recording method according to an embodiment. This is applied to a multipoint control unit (MCU) in a conference recording scenario.

As shown in FIG. 2, the conference recording method provided in this embodiment includes the following steps:

Step 201: The multipoint control unit determines, based on feature information of a to-be-recorded person, an audio video bitstream that needs to be recorded, from audio video bitstreams sent by site terminals.

In the foregoing description of the application scenario of this method, in this embodiment, the feature information includes picture information or sound information. In other words, the MCU can independently determine, based on the picture information of the to-be-recorded person, the audio video bitstream that needs to be recorded; or can independently determine, based on the sound information of the to-be-recorded person, the audio video bitstream that needs to be recorded; or can determine, by jointly using the picture information and the sound information of the to-be-recorded person, the audio video bitstream that needs to be recorded. It may be understood that the audio video bitstream that needs to be recorded is determined by jointly using the picture information and the sound information of the to-be-recorded person, to improve screening accuracy of the audio video bitstream and reduce a screening error rate.

In actual application, there may be one or more to-be-recorded persons. If the feature information that is of the to-be-recorded person and that is received by the MCU from a conference AS belongs to the same to-be-recorded person, it indicates that there is only one to-be-recorded person. If the received feature information of the to-be-recorded person belongs to a plurality of different to-be-recorded persons, it indicates that there are a plurality of to-be-recorded persons. In actual application, the plurality of to-be-recorded persons may be located in the same site, that is, jointly correspond to the same site terminal; or may be located in different sites, that is, separately correspond to different site terminals.

When there are a plurality of to-be-recorded persons, an actual recording requirement may be: recording a multi-picture conference, where each picture corresponds to a different to-be-recorded person.

When there is only one to-be-recorded person, there may be a plurality of actual recording requirements. The following provides several recording requirements as examples:

(1) recording a complete conference in which the to-be-recorded person participates;

(2) recording the conference only when the to-be-recorded person makes a speech; and (3) recording the conference when the to-be-recorded person appears.

It may be understood that, in actual application, different recording requirements correspond to different audio video bitstreams that need to be recorded. For example, for the recording requirement (1), the determined audio video bitstream is specifically the entire audio video bitstream in a conference process in the site in which the to-be-recorded person is located. For another example, for the recording requirement (2), the determined audio video bitstream is specifically the audio video bitstream when the to-be-recorded person makes a speech.

In a possible implementation, the MCU in this embodiment may determine, by using a pre-trained neural network model based on the feature information of the to-be-recorded person, the audio video bitstream that needs to be recorded, from the audio video bitstreams. The neural network model is obtained through training based on a large amount of feature information of different persons and materials that include feature information of different persons (for example, a picture or an audio file of the to-be-recorded person). It will be appreciated that training the neural network model that can accurately identify a video bitstream carrying a type of picture information and can accurately identify an audio bitstream carrying a type of sound information belongs to a relatively mature technology.

Step 202: The multipoint control unit sends, to the recording server, the audio video bitstream that needs to be recorded, so that the recording server performs conference recording.

The MCU obtains, through screening, the audio video bitstream that needs to be recorded. The recording server is a server that can be used in cooperation with the MCU and the site terminal and that can perform integrated synchronized recording on a video, an audio, a computer screen signal, and the like. Therefore, after the MCU sends, to the recording server, the audio video bitstream that needs to be recorded, the recording server can perform the conference recording based on the audio video bitstream that needs to be recorded.

The foregoing is the conference recording method according to this embodiment of this application. The feature information (including the picture information or the sound information) of the to-be-recorded person is different from feature information of another participant. In other words, the feature information of the to-be-recorded person uniquely corresponds to the to-be-recorded person. Therefore, the multipoint control unit (MCU) can accurately determine, based on the feature information of the to-be-recorded person, the audio video bitstream that needs to be recorded, from the audio video bitstreams sent from sites. Then, the MCU sends, to the recording server, the audio video bitstream that needs to be recorded, so that the recording server can perform conference recording based on the audio video bitstream received from the MCU. In this method, based on the feature information of the to-be-recorded person, automatic screening is implemented on the audio video bitstream that needs to be recorded. In this way, no manual screening is required, thereby reducing the manual costs of the conference recording and greatly improving conference recording efficiency. This method is used to improve convenience of the conference recording and promote wide application of a video conference function.

Figure 3:
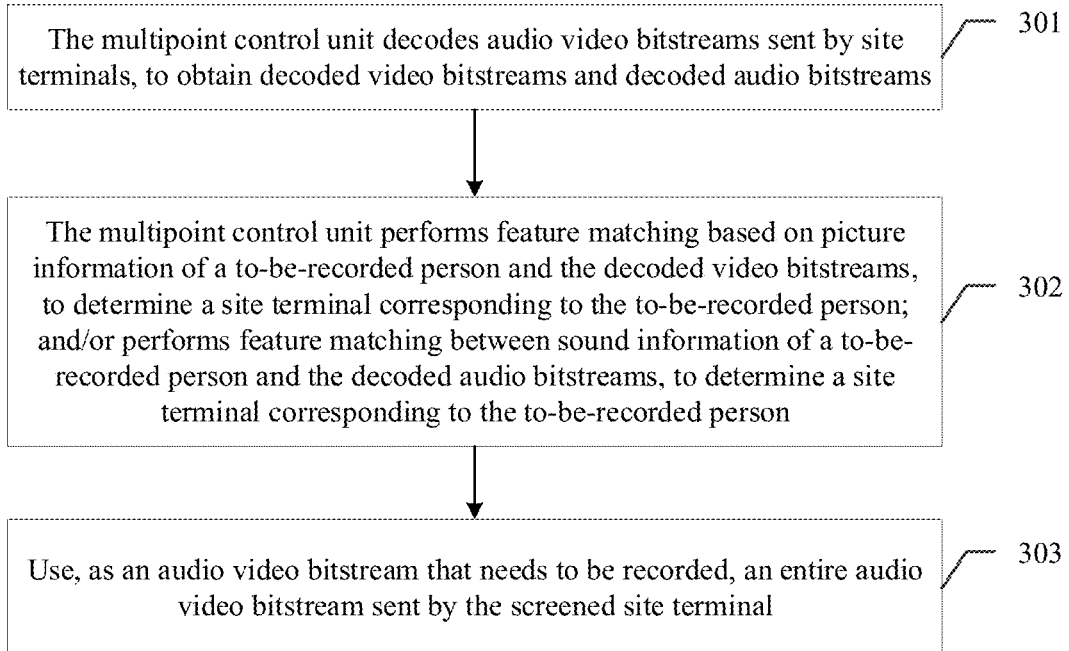
FIG. 3 is a flowchart in which a multipoint control unit obtains an audio video bitstream that needs to be recorded according to an embodiment.
Figure 4:
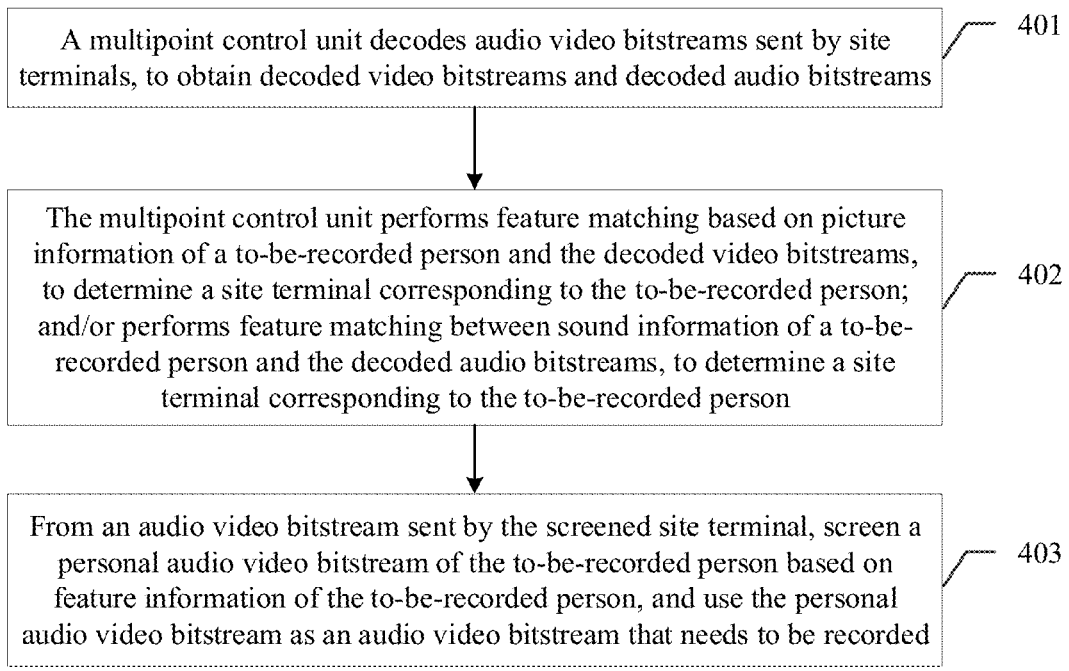
FIG. 4 is another flowchart in which a multipoint control unit obtains an audio video bitstream that needs to be recorded according to an embodiment of this application.

In actual application, the recording requirement (1) in the foregoing example indicates that the audio video bitstream that needs to be recorded is the entire audio video bitstream of the site in which the to-be-recorded person is located, and the recording requirements (2) and (3) indicate that the audio video bitstream that needs to be recorded is the personal audio video bitstream of the to-be-recorded person. For different audio video bitstreams that need to be recorded, implementations of step 201 are different. With reference to FIG. 3, the following describes a detailed procedure of step 201 when the audio video bitstream that needs to be recorded is the entire audio video bitstream of the site in which the to-be-recorded person is located. With reference to FIG. 4, the following describes a detailed procedure of step 201 when the audio video bitstream that needs to be recorded is the personal audio video bitstream of the to-be-recorded person.

FIG. 3 is a flowchart in which the multipoint control unit obtains the audio video bitstream that needs to be recorded according to this embodiment.

As shown in FIG. 3, when the audio video bitstream that needs to be recorded is the entire audio video bitstream of the site in which the to-be-recorded person is located, that the multipoint control unit obtains the audio video bitstream that needs to be recorded specifically includes the following steps:

Step 301: The multipoint control unit decodes the audio video bitstreams sent by the site terminals, to obtain decoded video bitstreams and decoded audio bitstreams.

In this embodiment, the audio video bitstream sent by the site terminal to the MCU may be specifically a real-time audio video transport protocol (real-time transport protocol, RTP) bitstream. To facilitate subsequent determining of the audio video bitstream that needs to be recorded, the audio video bitstream is decoded in advance. It will be appreciated that decoding an audio video bitstream belongs to a relatively mature technology. The MCU obtains, through decoding, the video bitstream and the audio bitstream that can be processed independently. It may be understood that a time sequence relationship exists between a video bitstream and an audio bitstream that are obtained through decoding an audio video bitstream. For example, if a site terminal 1 sends, to the MCU, an audio video bitstream from a moment T1 to a moment T2 of a site in which the site terminal 1 is located, the MCU obtains, through decoding, a video bitstream and an audio bitstream from the moment T1 to the moment T2 of the site in which the site terminal 1 is located.

Step 302: The multipoint control unit performs feature matching based on the picture information of the to-be-recorded person and the decoded video bitstreams, to determine a site terminal corresponding to the to-be-recorded person; or performs feature matching between the sound information of the to-be-recorded person and the decoded audio bitstreams, to determine a site terminal corresponding to the to-be-recorded person.

It may be understood that different sites are located at different geographical locations, and the same person is located in only one fixed site instead of another site when the conference is held. For example, if the site terminal 1 belongs to the site in which the to-be-recorded person is located, a site terminal that sends an audio video bitstream carrying the feature information of the to-be-recorded person is certainly the site terminal 1 rather than another site terminal. Therefore, to determine the audio video bitstream that needs to be recorded, in this embodiment, only the site terminal that transmits the feature information of the to-be-recorded person needs to be determined.

If the feature information that is of the to-be-recorded person and that is received by the MCU from the conference AS includes only the picture information, in this step, the MCU performs feature matching based on the picture information of the to-be-recorded person and the decoded video bitstreams, to determine the site terminal corresponding to the to-be-recorded person. If the feature information that is of the to-be-recorded person and that is received by the MCU from the conference AS includes only the sound information, in this step, the MCU performs feature matching based on the sound information of the to-be-recorded person and the decoded audio bitstreams, to determine the site terminal corresponding to the to-be-recorded person. It may be understood that if the feature information that is of the to-be-recorded person and that is received by the MCU from the conference AS includes both the picture information and the sound information, the site terminal corresponding to the to-be-recorded person is matched by jointly using the picture information and the sound information, thereby improving accuracy and credibility of a matching result and reducing an error rate.

By using the foregoing steps 301 and 302, the following process is implemented: the multipoint controller determines the site terminal corresponding to the to-be-recorded person. In other words, the site terminal finally determined through matching in step 302 is screened from the plurality of site terminals by the multipoint control unit based on the feature information of the to-be-recorded person and the audio video bitstreams sent by the site terminals.

Step 303: Use, as the audio video bitstream that needs to be recorded, an entire audio video bitstream sent by the determined site terminal.

A recording requirement is the foregoing recording requirement (1), that is, recording the entire conference in which the to-be-recorded person participates. Therefore, when the audio video bitstream that needs to be recorded is determined, the entire audio video bitstream that is sent by the site terminal determined in step 302 is directly used as the audio video bitstream that needs to be recorded.

The procedure shown in FIG. 3 is performed. In this way, the MCU obtains, through screening, the entire audio video bitstream of the site in which the to-be-recorded person is located, and sends the entire audio video bitstream to the recording server for conference recording, to meet the foregoing recording requirement (1).

FIG. 4 is another flowchart in which a multipoint control unit obtains an audio video bitstream that needs to be recorded according to an embodiment.

As shown in FIG. 4, when the audio video bitstream that needs to be recorded is the personal audio video bitstream of the to-be-recorded person, that the multipoint control unit obtains the audio video bitstream that needs to be recorded specifically includes the following steps:

Step 401: The multipoint control unit decodes the audio video bitstreams sent by the site terminals, to obtain decoded video bitstreams and decoded audio bitstreams.

Step 402: The multipoint control unit performs feature matching based on the picture information of the to-be-recorded person and the decoded video bitstreams, to determine a site terminal corresponding to the to-be-recorded person; or performs feature matching between the sound information of the to-be-recorded person and the decoded audio bitstreams, to determine a site terminal corresponding to the to-be-recorded person.

In this embodiment, implementations of steps 401 and 402 are the same as those of steps 301 and 302. For related descriptions of steps 401 and 402, refer to steps 301 and 302. Details are not described herein again.

Step 403: From an audio video bitstream sent by the determined site terminal, determine the personal audio video bitstream of the to-be-recorded person based on the feature information of the to-be-recorded person, and use the personal audio video bitstream as the audio video bitstream that needs to be recorded.

If the feature information that is of the to-be-recorded person and that is received by the MCU from the conference AS includes only the sound information, an actual recording requirement is very likely to be the recording requirement (2), that is, recording only the conference when the to-be-recorded person makes a speech. In this step, for the recording requirement, an audio bitstream that is from a moment T3 to a moment T4 and that includes the sound information of the to-be-recorded person may be determined from the audio bitstream that is from the moment T1 to the moment T2 and that is obtained through decoding the sound information of the to-be-recorded person in step 401 (the conference start moment T1 is earlier than the conference end moment T2, the speech start moment T3 of the to-be-recorded person is earlier than the speech end moment T4 of the to-be-recorded person, and T3 is later than or the same as T1 and is earlier than T2, and T4 is earlier than or the same as T2). Because a time sequence relationship exists between a video bitstream and an audio bitstream that are obtained through decoding an audio video bitstream, a video bitstream from the moment T3 to the moment T4 may also be correspondingly obtained based on the audio bitstream from the moment T3 to the moment T4. The audio bitstream and the video bitstream from the moment T3 to the moment T4 are collectively referred to as the personal audio video bitstream of the to-be-recorded person. The audio video bitstream meets the recording requirement (2).

If the feature information that is of the to-be-recorded person and that is received by the MCU from the conference AS includes only the picture information, an actual recording requirement is very likely to be the recording requirement (3), that is, recording only the conference when the to-be-recorded person appears. In this step, for the recording requirement, a video bitstream that is from a moment T5 to a moment T6 and that includes the picture information of the to-be-recorded person may be determined from the video bitstream that is from the moment T1 to the moment T2 and that is obtained through decoding the picture information of the to-be-recorded person in step 401 (the conference start moment T1 is earlier than the conference end moment T2, the to-be-recorded person appears between the moment T5 to the moment T6, T5 is earlier than T6, T5 is later than or the same as T1, and T6 is earlier than or the same as T2). Because a time sequence relationship exists between a video bitstream and an audio bitstream that are obtained through decoding an audio video bitstream, an audio bitstream from the moment T5 to the moment T6 may also be correspondingly obtained based on the video bitstream from the moment T5 to the moment T6. The audio bitstream and the video bitstream from the moment T5 to the moment T6 are collectively referred to as the personal audio video bitstream of the to-be-recorded person. The audio video bitstream meets the recording requirement (3).

The following provides an application scenario of the method in this embodiment as an example. In this example scenario, there are a plurality of to-be-recorded persons, and the plurality of to-be-recorded persons are located in the same site, that is, the plurality of to-be-recorded persons correspond to the same site terminal. A specific recording requirement is recording only a conference when the to-be-recorded persons make a speech. Feature information that is of the to-be-recorded persons and that is obtained by the multipoint control unit includes sound information of each to-be-recorded person. In specific implementation of the conference recording method provided in this embodiment, the multipoint control unit (MCU) decodes audio video bitstreams sent by site terminals, to obtain decoded video bitstreams and decoded audio bitstreams; and performs feature matching between the sound information of the to-be-recorded persons and the decoded audio bitstreams, to determine the same site terminal corresponding to the to-be-recorded persons. The MCU determines personal audio video bitstreams of the to-be-recorded persons based on the sound information of the to-be-recorded persons, from an audio video bitstream sent by the determined site terminal. The audio video bitstreams are jointly used as the audio video bitstreams that need to be recorded. The MCU finally sends, to the recording server, these audio video bitstreams that need to be recorded, to perform conference recording.

Based on a single-stream conference capability and a multi-stream conference capability, the site terminal may be classified into two types: a single-stream advanced video coding (AVC) site terminal and a multi-stream scalable video coding (SVC) site terminal. In actual application, site terminals in a conference recording scenario may be all AVC site terminals, or may be all SVC site terminals. Because conference capabilities of the AVC site terminal and the SVC site terminal are different, operations performed by the multipoint control unit (MCU) in the conference recording method provided in this embodiment of this application are also correspondingly different. The following separately describes the conference recording method in an AVC site terminal scenario and the conference recording method in an SVC site terminal scenario.

Method Embodiment 2 (AVC Site Terminal Scenario)

Figure 5:
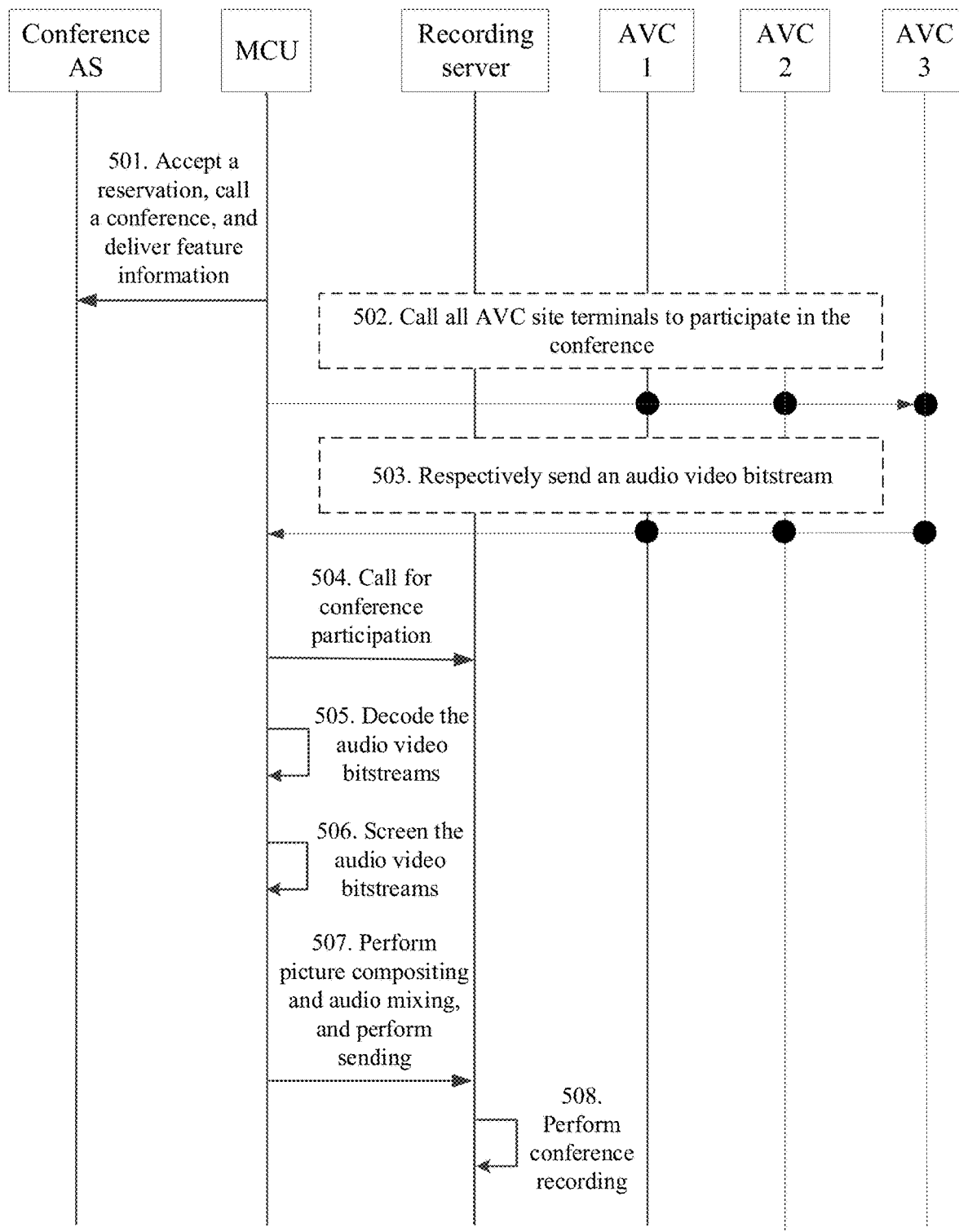
FIG. 5 is a diagram of signaling in a conference recording method according to an embodiment of this application.

FIG. 5 is a diagram of signaling in a conference recording method according to an embodiment. In the conference recording scenario shown in FIG. 5, a multipoint control unit (MCU), a conference AS, a recording server, and a plurality of AVC site terminals: respectively an AVC 1, an AVC 2, and an AVC 3 are included.

The conference recording method shown in FIG. 5 includes the following steps:

Step 501: The conference AS calls a conference to the multipoint control unit (MCU) according to a reservation of a user, and delivers feature information of a to-be-recorded person to the MCU during the calling.

In this embodiment, the to-be-recorded person corresponds to at least two different AVC site terminals. In other words, the feature information that is of the to-be-recorded person and that is delivered by the conference AS belongs to at least two to-be-recorded persons. For example, the conference AS delivers feature information of a to-be-recorded person Role1 and feature information of a to-be-recorded person Role2.

Step 502: The multipoint control unit calls all the AVC site terminals to participate in the conference, where the AVC site terminals include the AVC 1, the AVC 2, and the AVC 3.

Step 503: The AVC 1, the AVC 2, and the AVC 3 participate in the conference, and separately send an audio video bitstream to the MCU.

Step 504: The MCU calls the recording server to participate in the conference.

Step 505: The MCU separately decodes the audio video bitstreams sent by the AVC 1, the AVC 2, and the AVC 3.

In this step, the MCU separately decodes the audio video bitstreams sent by the AVC 1, the AVC 2, and the AVC 3, so that the MCU can obtain, through decoding, an audio bitstream and a video bitstream separately sent by each of the AVC 1, the AVC 2, and the AVC 3. The audio bitstream and the video bitstream are obtained through decoding, to facilitate subsequent screening of the audio video bitstreams based on the feature information of the to-be-recorded persons: Role1 and Role2.

Step 506: The MCU determines, based on the feature information of the to-be-recorded person, an audio video bitstream that needs to be recorded, from the audio video bitstreams respectively sent by the AVC 1, the AVC 2, and the AVC 3.

In specific implementation of this step, a site terminal corresponding to the to-be-recorded person may be determined based on the feature information of the to-be-recorded person and the audio bitstreams and the video bitstreams that are of the site terminals and that are obtained through decoding. For a specific screening process, refer to the foregoing embodiment. Details are not described herein again.

For example, finally, the site terminal that corresponds to Role1 and that is determined based on the feature information of Role1 is the AVC 1, and the site terminal that corresponds to Role2 and that is determined based on the feature information of Role2 is the AVC 2. It may be understood that, to determine the audio video bitstream that needs to be recorded, the MCU may perform the screening in a manner of specifying a video source. For example, the MCU specifies a video source name of the AVC 1; screens out an audio bitstream and a video bitstream that are inconsistent with the video source name; and uses, as an audio bitstream and a video bitstream that need to be recorded for Role1, the audio bitstream and the video bitstream that are obtained through screening. The MCU specifies a video source name of the AVC 2; screens out an audio bitstream and a video bitstream that are inconsistent with the video source name; and uses, as an audio bitstream and a video bitstream that need to be recorded for Role2, the audio bitstream and the video bitstream that are obtained through screening.

Step 507: The MCU performs picture compositing on the video bitstream that needs to be recorded, to obtain a composite picture, and sends the composite picture to the recording server; and performs audio mixing on the audio bitstream that needs to be recorded, and then sends the mixed audio bitstream to the recording server.

In actual application, the MCU has a function of performing picture compositing on the video bitstream sent by the AVC site terminal, and a function of performing audio mixing on the audio bitstream sent by the AVC site terminal. In this embodiment, the to-be-recorded person corresponds to the at least two different AVC site terminals. Therefore, the MCU may perform compositing on the video bitstreams that are of the plurality of to-be-recorded persons (for example, Role1 and Role2) and that need to be recorded and are obtained in the previous step, and perform audio mixing on the audio bitstreams that are of the plurality of to-be-recorded persons and that need to be recorded and are obtained in the previous step.

Step 508: After receiving the bitstreams, the recording server performs conference recording.

In this embodiment, the to-be-recorded person corresponds to at least two AVC site terminals. In other words, there are at least two to-be-recorded persons. The conference AS delivers the feature information of the to-be-recorded person, to specify the to-be-recorded person for the conference recording. When the audio video bitstream that needs to be recorded is personal audio video bitstreams of a plurality of to-be-recorded persons, in the conference recording method provided in this embodiment, the MCU is used to perform the picture compositing and the audio mixing and then send the composite picture and the mixed audio bitstream to the recording server, thereby greatly reducing a network bandwidth and saving storage space of the recording server. In addition, in this embodiment, real-time recording is performed on the specified to-be-recorded person, to avoid an editing process of the audio bitstream and the video bitstream in manual post production, thereby reducing the manual costs and improving conference recording efficiency.

Method Embodiment 3 (SVC Site Terminal Scenario)

Figure 6:
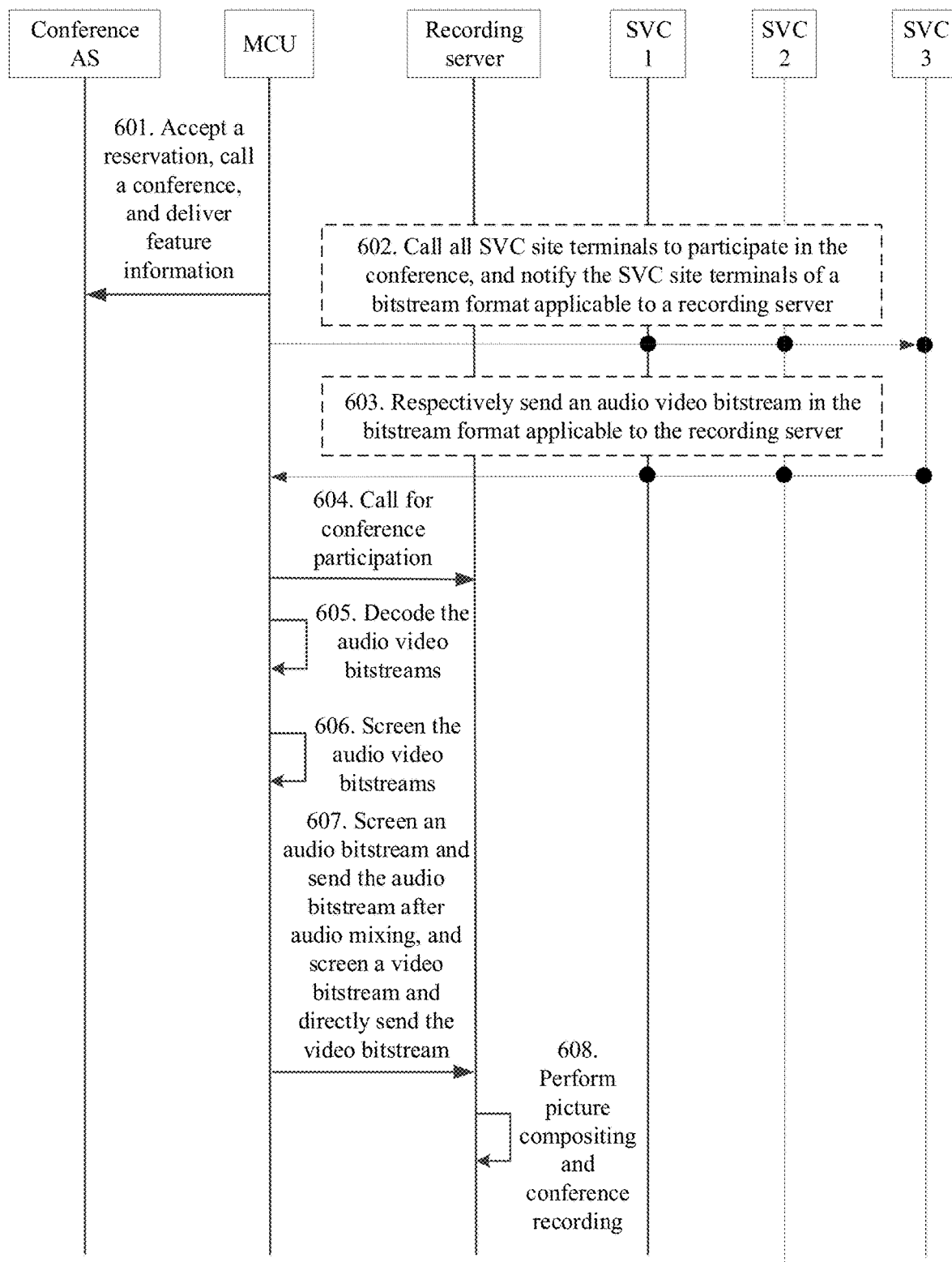
FIG. 6 is a diagram of signaling in another conference recording method according to an embodiment of this application.

FIG. 6 is a diagram of signaling in another conference recording method according to an embodiment. In the conference recording scenario shown in FIG. 6, a multipoint control unit (MCU), a conference AS, a recording server, and a plurality of SVC site terminals: respectively an SVC 1, an SVC 2, and an SVC 3 are included.

The conference recording method shown in FIG. 6 includes the following steps:

Step 601: The conference AS calls a conference to the multipoint control unit (MCU) according to a reservation of a user, and delivers feature information of a to-be-recorded person.

In this embodiment, the to-be-recorded person corresponds to at least two different SVC site terminals. In other words, the feature information that is of the to-be-recorded person and that is delivered by the conference AS belongs to at least two to-be-recorded persons. For example, the conference AS delivers feature information of a to-be-recorded person Role3 and feature information of a to-be-recorded person Role4.

Step 602: The multipoint control unit calls all the SVC site terminals including the SVC 1, the SVC 2, and the SVC 3 to participate in the conference, and the multipoint control unit notifies the SVC 1, the SVC 2, and the SVC 3 of a bitstream format applicable to the recording server.

In actual application, each SVC site terminal can provide the MCU with audio video bitstreams in different bitstream formats. However, the recording server can generally perform conference recording based on an audio video bitstream in one of the bitstream formats. An audio video bitstream in another bitstream format is not applicable to the recording server. To improve transmission efficiency of the audio video bitstream and avoid a case in which the SVC site terminal sends, to the MCU, an audio video bitstream in a bitstream format not applicable to the recording server, in this embodiment, each SVC site terminal needs to be notified of a bitstream format applicable to the recording server in advance.

Step 603: The SVC 1, the SVC 2, and the SVC 3 participate in the conference, and separately send, to the MCU, an audio video bitstream in the bitstream format applicable to the recording server.

Step 604: The MCU calls the recording server to participate in the conference.

Step 605: The MCU separately decodes the audio video bitstreams sent by the SVC 1, the SVC 2, and the SVC 3.

In this step, the MCU separately decodes the audio video bitstreams sent by the SVC 1, the SVC 2, and the SVC 3, so that the MCU can obtain the audio bitstream and the video bitstream separately sent by each of the SVC 1, the SVC 2, and the SVC 3. The audio bitstream and the video bitstream are obtained through decoding, to facilitate subsequent screening of the audio video bitstreams based on the feature information of the to-be-recorded persons: Role3 and Role4.

Step 606: The MCU separately determines, based on the feature information of the to-be-recorded person, an audio video bitstream that needs to be recorded, from the audio video bitstreams that are in the bitstream format applicable to the recording server and that are respectively sent by the SVC 1, the SVC 2, and the SVC 3.

In specific implementation of this step, a site terminal corresponding to the to-be-recorded person may be determined based on the feature information of the to-be-recorded person and the audio bitstreams and the video bitstreams that are of the site terminals and that are obtained through decoding. For a specific screening process, refer to the foregoing embodiment. Details are not described herein again.

For example, finally, the site terminal that corresponds to Role3 and that is determined based on the feature information of Role3 is the SVC 3, and the site terminal that corresponds to Role4 and that is determined based on the feature information of Role4 is the SVC 2. It may be understood that, to determine the audio video bitstream that needs to be recorded, the MCU may perform the screening in a manner of specifying a video source. For example, the MCU specifies a video source name of the SVC 3; screens out an audio bitstream and a video bitstream that are inconsistent with the video source name; and uses, as an audio bitstream and a video bitstream that need to be recorded for Role3, the audio bitstream and the video bitstream that are obtained through screening. The MCU specifies a video source name of the SVC 2; screens out an audio bitstream and a video bitstream that are inconsistent with the video source name; and uses, as an audio bitstream and a video bitstream that need to be recorded for Role4, the audio bitstream and the video bitstream that are obtained through screening.

Step 607: The MCU sends, to the recording server, video bitstreams that need to be recorded and that correspond to the at least two different SVC site terminals; and performs audio mixing on audio bitstreams that need to be recorded and that correspond to the at least two different SVC site terminals, and sends the mixed audio bitstream to the recording server.

Based on the foregoing examples, in this step, because the recording server has a function of performing picture compositing on the video bitstreams of the plurality of SVC site terminals, the video bitstreams that need to be recorded and that are sent by the SVC 3 and the SVC 2 in the previous step are sent to the recording server. The MCU has the function of performing audio mixing on the audio bitstreams sent by the SVC site terminals. Therefore, the MCU is responsible for the audio mixing on the audio bitstreams that need to be recorded and that are sent by the SVC 3 and the SVC 2.

Step 608: The recording server performs picture compositing on the video bitstreams that need to be recorded and that correspond to the at least two different SVC site terminals, to obtain a composite picture; and performs the conference recording based on the composite picture and the audio bitstream obtained after the audio mixing.

In this embodiment, the to-be-recorded person corresponds to at least two SVC site terminals. In other words, there are at least two to-be-recorded persons. The conference AS delivers the feature information of the to-be-recorded person, to specify the to-be-recorded person for the conference recording. When the audio video bitstream that needs to be recorded is personal audio video bitstreams of a plurality of to-be-recorded persons, in the conference recording method provided in this embodiment, the MCU is used to perform the audio mixing and then send the mixed audio bitstream to the recording server, so that the recording server performs picture compositing on video bitstreams that are of the plurality of to-be-recorded person and that are screened by the MCU and need to be recorded and finally performs conference recording, thereby greatly reducing a network bandwidth and saving storage space of the recording server. In addition, in this embodiment, real-time recording is performed on the specified to-be-recorded person, to avoid an editing process of the audio bitstream and the video bitstream in manual post production, thereby reducing the manual costs and improving conference recording efficiency.

Based on the conference recording method provided in the foregoing embodiments, correspondingly, this application further provides a conference recording apparatus. The following describes a specific implementation of the apparatus with reference to embodiments and the accompanying drawings.

Apparatus Embodiments

Figure 7:
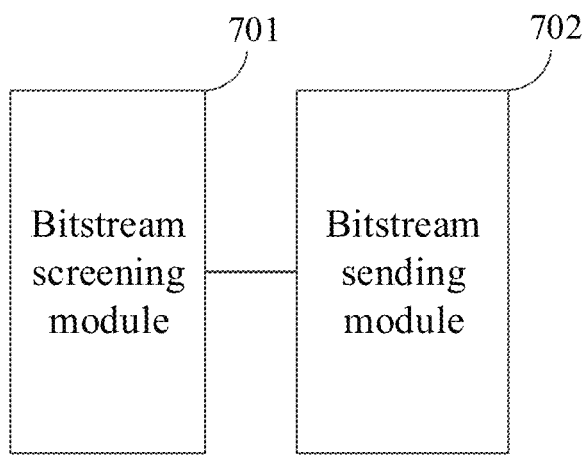
FIG. 7 is a schematic diagram of a structure of a conference recording apparatus according to an embodiment of this application.

FIG. 7 is a schematic diagram of a structure of a conference recording apparatus according to an embodiment. As shown in FIG. 7, the apparatus includes: a bitstream screening module 701 and a bitstream sending module 702.

The bitstream screening module 701 is configured to determine, based on feature information of a to-be-recorded person, an audio video bitstream that needs to be recorded, from audio video bitstreams sent by site terminals.

The bitstream sending module 702 is configured to send, to a recording server, the audio video bitstream that needs to be recorded, so that the recording server performs conference recording. The feature information includes picture information or sound information.

In this embodiment, based on the feature information of the to-be-recorded person, the conference recording apparatus implements automatic screening on the audio video bitstream that needs to be recorded. In this way, no manual screening is required, thereby reducing the manual costs of the conference recording and greatly improving conference recording efficiency. The apparatus can be applied to improve convenience of the conference recording and promote wide application of a video conference function.

In actual application, according to a recording requirement, the audio video bitstream that needs to be recorded may be an entire audio video bitstream of a site in which the to-be-recorded person is located, or may be a personal audio video bitstream of the to-be-recorded person. The following separately describes implementations of the bitstream screening module 701 based on the two cases.

When the audio video bitstream that needs to be recorded is the entire audio video bitstream of the site in which the to-be-recorded person is located, the bitstream screening module 701 specifically includes a site terminal screening unit and a first bitstream screening unit.

The site terminal screening unit is configured to determine, based on the feature information of the to-be-recorded person and the audio video bitstreams sent by the site terminals, a site terminal corresponding to the to-be-recorded person.

The first bitstream screening unit is configured to use, as the audio video bitstream that needs to be recorded, an entire audio video bitstream sent by the screened site terminal.

When the audio video bitstream that needs to be recorded is the personal audio video bitstream of the to-be-recorded person, the bitstream screening module 701 specifically includes a site terminal screening unit and a second bitstream screening unit.

The site terminal screening unit is configured to determine, based on the feature information of the to-be-recorded person and the audio video bitstreams sent by the site terminals, a site terminal corresponding to the to-be-recorded person.

The second bitstream screening unit is configured to: from an audio video bitstream sent by the screened site terminal, determine the personal audio video bitstream of the to-be-recorded person based on the feature information of the to-be-recorded person, and use the personal audio video bitstream as the audio video bitstream that needs to be recorded.

In a possible implementation, regardless of whether the audio video bitstream that needs to be recorded is the entire audio video bitstream of the site in which the to-be-recorded person is located or the personal audio video bitstream of the to-be-recorded person, the site terminal screening unit of the conference recording apparatus may first determine, through matching, a site corresponding to the to-be-recorded person. Specifically, the site terminal screening unit specifically includes a decoding subunit and a site terminal determining subunit.

The decoding subunit is configured to decode the audio video bitstreams sent by the site terminals, to obtain decoded video bitstreams and decoded audio bitstreams.

The site terminal determining subunit is configured to: perform feature matching based on the picture information of the to-be-recorded person and the decoded video bitstreams, to determine the site terminal corresponding to the to-be-recorded person; or perform feature matching between the sound information of the to-be-recorded person and the decoded audio bitstreams, to determine the site terminal corresponding to the to-be-recorded person.

Based on a single-stream conference capability and a multi-stream conference capability, the site terminal may be classified into two types: a single-stream advanced video coding (AVC) site terminal and a multi-stream scalable video coding (SVC) site terminal. In actual application, site terminals in a conference recording scenario may be all AVC site terminals, or may be all SVC site terminals. Because conference capabilities of the AVC site terminal and the SVC site terminal are different, specific implementations of the conference recording apparatus provided in this embodiment of this application are also correspondingly different.

The following separately describes implementations of the conference recording apparatus in an AVC site terminal scenario and an SVC site terminal scenario.

When the to-be-recorded person corresponds to at least two different advanced video coding (AVC) site terminals, the bitstream screening module 701 specifically includes a third bitstream screening unit.

The third bitstream screening unit is configured to determine, based on the feature information of the to-be-recorded person, the audio video bitstream that needs to be recorded, from audio video bitstreams sent by the at least two different AVC site terminals.

The audio video bitstream that needs to be recorded includes a video bitstream that needs to be recorded and an audio bitstream that needs to be recorded, and the bitstream sending module 702 specifically includes a picture compositing unit, a picture sending unit, a first audio mixing unit, and a first audio sending unit.

The picture compositing unit is configured to perform picture compositing on the video bitstream that needs to be recorded, to obtain a composite picture.

The picture sending unit is configured to send the composite picture to the recording server.

The first audio mixing unit is configured to perform audio mixing on the audio bitstream that needs to be recorded.

The first audio sending unit is configured to send, to the recording server, an audio obtained after the audio mixing.

In this embodiment, the to-be-recorded person corresponds to at least two AVC site terminals. In other words, there are at least two to-be-recorded persons. The conference AS delivers the feature information of the to-be-recorded person, to specify the to-be-recorded person for the conference recording. When the audio video bitstream that needs to be recorded is personal audio video bitstreams of a plurality of to-be-recorded persons, the MCU in the conference recording apparatus provided in this embodiment is used to perform the picture compositing and the audio mixing and then send the composite picture and the mixed audio bitstream to the recording server, thereby greatly reducing a network bandwidth and saving storage space of the recording server. In addition, through applying the apparatus provided in this embodiment, real-time recording can be performed on the specified to-be-recorded person, to avoid an editing process of the audio bitstream and the video bitstream in manual post production, thereby reducing the manual costs and improving conference recording efficiency.

When the to-be-recorded person corresponds to at least two different scalable video coding (SVC) site terminals, the bitstream screening module 701 specifically includes a bitstream format notifying unit, a bitstream receiving unit, and a fourth bitstream screening unit.

The bitstream format notifying unit is configured to notify all the SVC site terminals of a bitstream format applicable to the recording server.

The bitstream receiving unit is configured to receive audio video bitstreams that are in the bitstream format applicable to the recording server and that are sent by the at least two different SVC site terminals.

The fourth bitstream screening unit is configured to determine, based on the feature information of the to-be-recorded person, the audio video bitstream that needs to be recorded, from the audio video bitstreams in the bitstream format applicable to the recording server.

The audio video bitstream that needs to be recorded includes a video bitstream that needs to be recorded and an audio bitstream that needs to be recorded, and the bitstream sending module 702 specifically includes a video bitstream sending unit, a second audio mixing unit, and a second audio sending unit.

The video bitstream sending unit is configured to send, to the recording server, video bitstreams that need to be recorded and that correspond to the at least two different SVC site terminals, so that the recording server performs picture compositing on the video bitstreams that need to be recorded and that correspond to the at least two different SVC site terminals, to obtain a composite picture.

The second audio mixing unit is configured to perform audio mixing on audio bitstreams that need to be recorded and that correspond to the at least two different SVC site terminals.

The second audio sending unit is configured to send, to the recording server, an audio obtained after the audio mixing.

In this embodiment, the to-be-recorded person corresponds to at least two SVC site terminals. In other words, there are at least two to-be-recorded persons. The conference AS delivers the feature information of the to-be-recorded person, to specify the to-be-recorded person for the conference recording. When the audio video bitstream that needs to be recorded is personal audio video bitstreams of a plurality of to-be-recorded persons, the MCU in the conference recording apparatus provided in this embodiment is used to perform the audio mixing and then send the mixed audio bitstream to the recording server, so that the recording server performs picture compositing on video bitstreams that are of the plurality of to-be-recorded person and that are screened by the MCU and need to be recorded and finally performs conference recording, thereby greatly reducing a network bandwidth and saving storage space of the recording server. In addition, through applying the apparatus provided in this embodiment, real-time recording can be performed on the specified to-be-recorded person, to avoid an editing process of the audio bitstream and the video bitstream in manual post production, thereby reducing the manual costs and improving conference recording efficiency.

In a possible implementation, the bitstream screening module 701 in this embodiment specifically includes a fifth bitstream screening unit.

The fifth bitstream screening unit is configured to determine, by using a pre-trained neural network model based on the feature information of the to-be-recorded person, the audio video bitstream that needs to be recorded, from the audio video bitstreams.

The neural network model is obtained through training based on a large amount of feature information of different persons and materials that include feature information of different persons (for example, a picture or an audio file of the to-be-recorded person).

For persons skilled in the art, training the neural network model that can accurately identify a video bitstream carrying a type of picture information and can accurately identify an audio bitstream carrying a type of sound information belongs to a relatively mature technology.

Based on the conference recording method and the conference recording apparatus provided in the foregoing embodiments, correspondingly, this application further provides a conference recording system. The following describes a specific implementation of the system with reference to embodiments and the accompanying drawings.

System Embodiment

Figure 8:
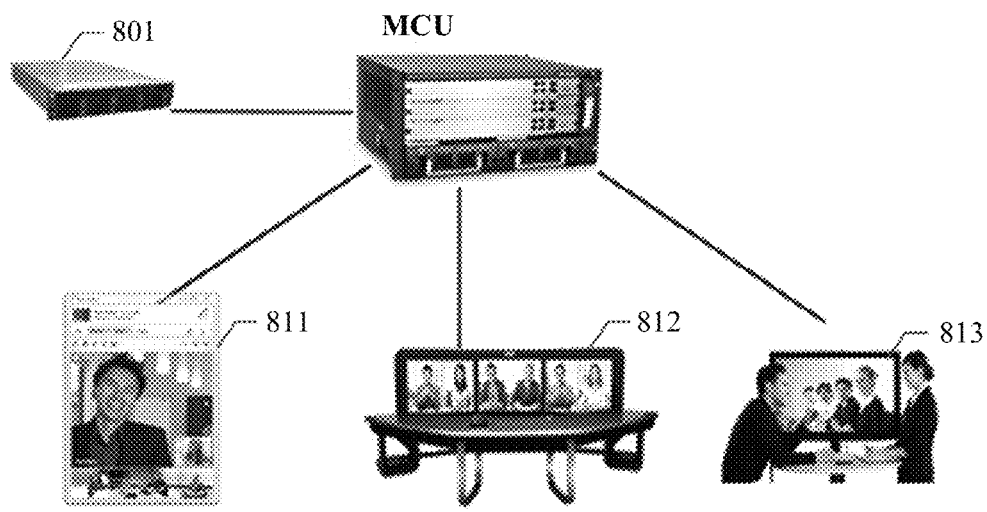
FIG. 8 is a schematic diagram of a structure of a conference recording system according to an embodiment of this application.

FIG. 8 is a schematic diagram of a structure of a conference recording system according to an embodiment of this application.

As shown in FIG. 8, the conference recording system provided in this embodiment includes a multipoint control unit (MCU), a recording server 801, and at least two site terminals.

In this embodiment, the multipoint control unit (MCU) may specifically perform the conference recording method provided in the foregoing embodiments.

The site terminal is configured to send an audio video bitstream to the multipoint control unit (MCU).

The multipoint control unit (MCU) is configured to: determine, based on feature information of a to-be-recorded person, an audio video bitstream that needs to be recorded, from the audio video bitstreams sent by the site terminals, where the feature information includes picture information or sound information; and send, to the recording server 801, the audio video bitstream that needs to be recorded.

The recording server 801 is configured to perform conference recording based on the audio video bitstream that needs to be recorded.

In this embodiment, there are at least two site terminals. All the site terminals may be all AVC site terminals, or may be all SVC site terminals. Each site terminal may be a terminal that uses the session initiation protocol (SIP), or may be a terminal that uses the H.323 protocol. A communications protocol used by the site terminal is not limited herein. As shown in FIG. 8, a site terminal 811 communicates with the MCU by using the SIP protocol, and site terminals 812 and 813 separately communicate with the MCU by using the H.323 protocol.

In this embodiment, based on the feature information of the to-be-recorded person, the conference recording system implements automatic screening on the audio video bitstream that needs to be recorded. In this way, no manual screening is required, thereby reducing the manual costs of the conference recording and greatly improving conference recording efficiency. This system is used to improve convenience of the conference recording and promote wide application of a video conference function.

Optionally, in the conference recording system provided in this embodiment, the MCU further has a function of forwarding an audio video bitstream. The following describes an application scenario of this function with reference to FIG. 8.

An example scenario in which the MCU forwards the audio video bitstream is that one site terminal requests to rebroadcast a conference of another site terminal from the MCU. The site terminal 813 is configured to send, to the MCU, a request of rebroadcasting a conference of the site terminal 812. In actual application, a format of an audio video bitstream that can be played by the site terminal 813 may be one of a plurality of bitstream formats that can be provided by the site terminal 812. Therefore, the request sent by the site terminal 813 carries a bitstream format of an audio video bitstream that can be played by the site terminal 813. The MCU is configured to send a notification to the site terminal 812 based on the bitstream format in the request, so that the site terminal 812 sends an audio video bitstream in the format to the MCU based on the notification. The MCU is further configured to forward, to the site terminal 813, the audio video bitstream that is in the bitstream format and is sent by the site terminal 812 and that can be played by the site terminal 813, so that the site terminal 813 can play the audio video bitstream. Therefore, all participants in a site in which the site terminal 813 is located can view the conference held by using the site terminal 812.

Optionally, in the conference recording system provided in this embodiment, the recording server 801 further has a function of forwarding an audio video bitstream. The following describes an application scenario of this function.

An example scenario in which the recording server 801 forwards the audio video bitstream is that another server requests an on-demand conference or a live conference from the recording server. The recording server 801 is further configured to receive an on-demand request or a live request of the another server. In actual application, a format of an audio video bitstream that can be played by the another server may be one of a plurality of bitstream formats that can be provided by site terminals. Therefore, the on-demand request or the live request sent by the another server may carry a bitstream format of an audio video bitstream that can be played by the another server. The recording server 801 is further configured to notify the MCU of the bitstream format, so that the MCU notifies each site terminal of the bitstream format. After receiving an audio video bitstream that confirms to the bitstream format and that is sent by each site terminal, the MCU sends the audio video bitstream to the recording server. The recording server 801 is further configured to forward, based on the on-demand request or the live request and the audio video bitstream sent by the MCU, to the another server that makes the request. For example, the another server requests an on-demand conference of the site terminal 811 from the recording server 801, and the recording server 801 forwards, to the another server, an audio video bitstream that confirms to the bitstream format of the another server and that comes from the site terminal 811. For another example, if the another server requests, from the recording server 801, live conferences of all site terminals participating in the conference, the recording server 801 forwards, to the another server, audio video bitstreams that confirm to the bitstream format of the another server and that come from the site terminals. If the bitstream format applicable to the recording server 801 is the same as the bitstream format that can be played by the another server making the request, the recording server may further performing recording and forwarding to the another server at the same time. Forwarding content is a multi-picture (that is, a composite picture) audio video bitstream.

In a conference recording system provided in this embodiment, both the MCU and the recording server 801 can provide a service of forwarding an audio video bitstream, thereby enriching an overall function of the conference recording system and improving user experience.

Figure 9:
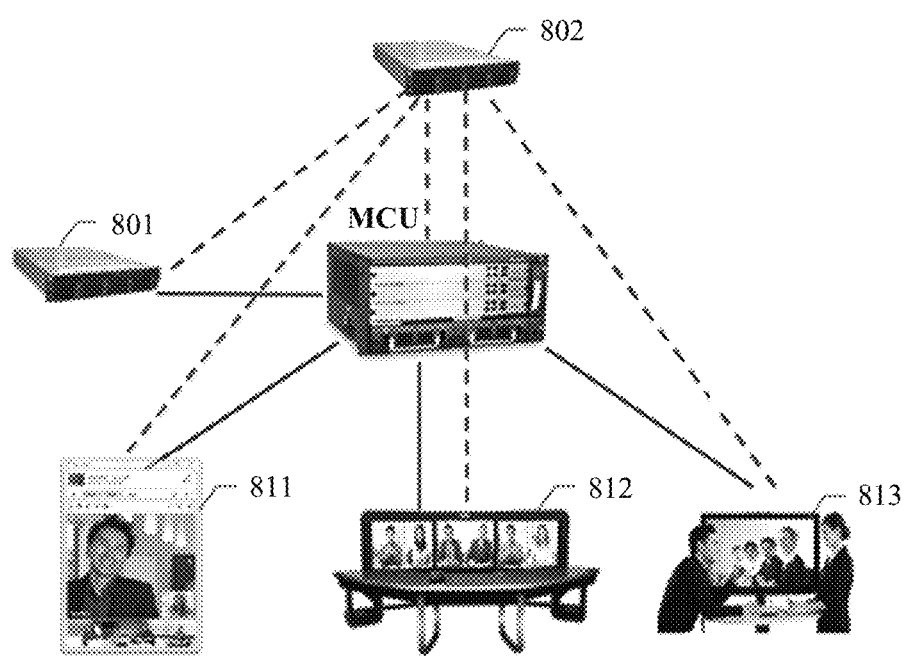
FIG. 9 is a schematic diagram of a structure of another conference recording system according to an embodiment of this application.

Optionally, the conference recording system provided in this embodiment may further include a conference application server (conference AS) 802. FIG. 9 is a schematic diagram of a structure of another conference recording system according to an embodiment.

In the system shown in FIG. 9, a dashed connection line between a site terminal and the conference AS 802 indicates that the site terminal registers with the conference AS 802, a dashed connection line between a recording server 801 and the conference AS 802 indicates that the recording server 801 registers with the conference AS 802, and a dashed connection line between the conference AS 802 and an MCU indicates that the conference AS 802 delivers feature information of a to-be-recorded person to the MCU. The conference AS 802 is configured to: provide a user with a function of uploading a material that includes the feature information of the to-be-recorded person (for example, a picture or an audio file of the to-be-recorded person); process the material to obtain the feature information of the to-be-recorded person; and deliver the feature information of the to-be-recorded person to the MCU. The conference AS 802 is further configured to: store materials corresponding to a plurality of persons, and obtain feature information of each person through processing. After the user logs in the conference AS 802, the conference AS 802 provides the user with the materials corresponding to the persons, receives a selection message of the user for a material of the to-be-recorded person, and delivers, to the MCU based on the selection message, the feature information of the to-be-recorded person corresponding to the selected material. In actual application, the conference AS 802 may deliver the feature information of the to-be-recorded person to the MCU when calling a conference to the MCU.

In a conference recording system provided in this embodiment, the conference AS 802 can provide the user with a service of specifying the to-be-recorded person, thereby improving convenience of subsequent conference recording. Recording is performed only on the to-be-recorded person, thereby saving storage space of the recording server 801, reducing a communication bandwidth, and improving conference recording user experience.

It should be understood that, in this application, "at least one (item)" means one or more, and "a plurality of" means two or more. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

The foregoing embodiments are merely intended to describe examples of technical solutions of this application, but are not intended to limit this application. Although this application is described in detail with reference to the foregoing embodiments, persons of ordinary skill in the art should understand that they may still make modifications to technical solutions described in the foregoing embodiments or make equivalent replacements to some technical features thereof, and such modifications or replacements may not depart from the spirit and scope of technical solutions of embodiments of this application.

What is claimed is:

1. A conference recording method, comprising:
   determining, by a multipoint control unit, a first audio video bitstream that needs to be recorded from audio video bitstreams sent by site terminals, based on feature information of a to-be-recorded person, wherein the feature information comprises picture information or sound information; and
   sending, by the multipoint control unit, to a recording server, the first audio video bitstream that needs to be recorded;
   wherein determining the first audio video bitstream that needs to be recorded comprises determining, based on the feature information of the to-be-recorded person and the audio video bitstreams sent by the site terminals, a site terminal corresponding to the to-be-recorded person;
   wherein the first audio video bitstream is an entire audio video bitstream sent by the site terminal corresponding to the to-be-recorded person;
   wherein determining the site terminal corresponding to the to-be-recorded person comprises:
   decoding the audio video bitstreams sent by the site terminals, to obtain decoded video bitstreams and decoded audio bitstreams; and
   performing feature matching based on the picture information or the sound information of the to-be-recorded person and the decoded audio video bitstreams, to determine the site terminal corresponding to the to-be-recorded person;
wherein the site terminal corresponding to the to-be-recorded person is a scalable video coding (SVC) site terminal, and wherein determining the first audio video bitstream that needs to be recorded comprises:
notifying a plurality of SVC site terminals of a bitstream format applicable to the recording server;
receiving audio video bitstreams that are in the bitstream format applicable to the recording server and that are sent by at least two different SVC site terminals; and
determining, based on the feature information of the to-be-recorded person, the first audio video bitstream that needs to be recorded, from the audio video bitstreams in the bitstream format applicable to the recording server.

2. The method according to claim 1, wherein the site terminals comprise an advanced video coding (AVC) site terminal.

3. The method according to claim 1, wherein the first audio video bitstream comprises a first video bitstream and a first audio bitstream, and wherein sending the first audio video bitstream comprises:
performing picture compositing on the first audio video bitstream, to obtain a composite picture;
sending the composite picture to the recording server;
performing audio mixing on the first audio video bitstream, to obtain a mixed audio bitstream; and
sending the mixed audio bitstream to the recording server.

4. The conference recording method according to claim 1, wherein determining the first audio video bitstream that needs to be recorded comprises:
determining, by using a pre-trained neural network model based on the feature information of the to-be-recorded person, the first audio video bitstream, from the audio video bitstreams.

5. A conference recording system, comprising:
a multipoint control unit;
a recording server; and
at least two site terminals;
wherein the at least two site terminals are configured to send audio video bitstreams to the multipoint control unit;
wherein the multipoint control unit is configured to:
determine, based on feature information of a to-be-recorded person, a first audio video bitstream that needs to be recorded, from the audio video bitstreams sent by the at least two site terminals, wherein the feature information comprises picture information or sound information; and
send, to the recording server, the first audio video bitstream that needs to be recorded;
wherein the recording server is configured to perform conference recording based on the first audio video bitstream that needs to be recorded;
wherein the first audio video bitstream is an entire audio video bitstream of a site at which the to-be-recorded person is located;
wherein the multipoint control unit is further configured to determine, based on the feature information of the to-be-recorded person and the audio video bitstreams sent by the at least two site terminals, a site terminal corresponding to the to-be-recorded person;
wherein determining the site terminal corresponding to the to-be-recorded person comprises:
decoding the audio video bitstreams sent by the site terminals, to obtain decoded video bitstreams and decoded audio bitstreams; and
performing feature matching based on the picture information or the sound information of the to-be-recorded person and the decoded audio video bitstreams, to determine the site terminal corresponding to the to-be-recorded person;
wherein the site terminal corresponding to the to-be-recorded person is a scalable video coding (SVC) site terminal, and wherein determining the first audio video bitstream that needs to be recorded comprises:
notifying a plurality of SVC site terminals of a bitstream format applicable to the recording server;
receiving audio video bitstreams that are in the bitstream format applicable to the recording server and that are sent by at least two different SVC site terminals; and
determining, based on the feature information of the to-be-recorded person, the first audio video bitstream that needs to be recorded, from the audio video bitstreams in the bitstream format applicable to the recording server.

6. A multipoint control unit, comprising:
a memory configured to store instructions; and
a processor coupled to the memory and configured to execute the instructions, wherein execution of the instructions facilitates performance of the following by the multipoint control unit;
determining an audio video bitstream that needs to be recorded from audio video bitstreams sent by site terminals, based on feature information of a person, wherein the feature information comprises picture information or sound information; and
sending the audio video bitstream that needs to be recorded to a recording server to facilitate conference recording by the recording server;
wherein determining the first audio video bitstream that needs to be recorded comprises determining, based on the feature information of the to-be-recorded person and the audio video bitstreams sent by the site terminals, a site terminal corresponding to the to-be-recorded person;
wherein the first audio video bitstream is an entire audio video bitstream sent by the site terminal corresponding to the to-be-recorded person;
wherein determining the site terminal corresponding to the to-be-recorded person comprises:
decoding the audio video bitstreams sent by the site terminals, to obtain decoded video bitstreams and decoded audio bitstreams; and
performing feature matching based on the picture information or the sound information of the to-be-recorded person and the decoded audio video bitstreams, to determine the site terminal corresponding to the to-be-recorded person;
wherein the site terminal corresponding to the to-be-recorded person is a scalable video coding (SVC) site terminal, and wherein determining the first audio video bitstream that needs to be recorded comprises:
notifying a plurality of SVC site terminals of a bitstream format applicable to the recording server;
receiving audio video bitstreams that are in the bitstream format applicable to the recording server and that are sent by at least two different SVC site terminals; and
determining, based on the feature information of the to-be-recorded person, the first audio video bitstream that needs to be recorded, from the audio video bitstreams in the bitstream format applicable to the recording server.

7. The multipoint control unit according to claim 6, wherein the site terminals comprise an advanced video coding (AVC) site terminal.

8. The multipoint control unit according to claim 6, wherein the first audio video bitstream comprises a first video bitstream and a first audio bitstream, and wherein sending the first audio video bitstream comprises:
  performing picture compositing on the first audio video bitstream, to obtain a composite picture;
  sending the composite picture to the recording server;
  performing audio mixing on the first audio video bitstream, to obtain a mixed audio bitstream; and
  sending the mixed audio bitstream to the recording server.

9. The multipoint control unit according to claim 6, wherein determining the first audio video bitstream that needs to be recorded comprises:
  determining, by using a pre-trained neural network model based on the feature information of the to-be-recorded person, the first audio video bitstream, from the audio video bitstreams.

10. The conference recording system according to claim 5, wherein the site terminals comprise an advanced video coding (AVC) site terminal.

11. The conference recording system according to claim 5, wherein the first audio video bitstream comprises a first video bitstream and a first audio bitstream, and wherein sending the first audio video bitstream comprises:
  performing picture compositing on the first audio video bitstream, to obtain a composite picture;
  sending the composite picture to the recording server;
  performing audio mixing on the first audio video bitstream, to obtain a mixed audio bitstream; and
  sending the mixed audio bitstream to the recording server.

12. The conference recording system according to claim 5, wherein determining the first audio video bitstream that needs to be recorded comprises:
  determining, by using a pre-trained neural network model based on the feature information of the to-be-recorded person, the first audio video bitstream, from the audio video bitstreams.

\* \* \* \* \*